UNITED STATES PATENT OFFICE.

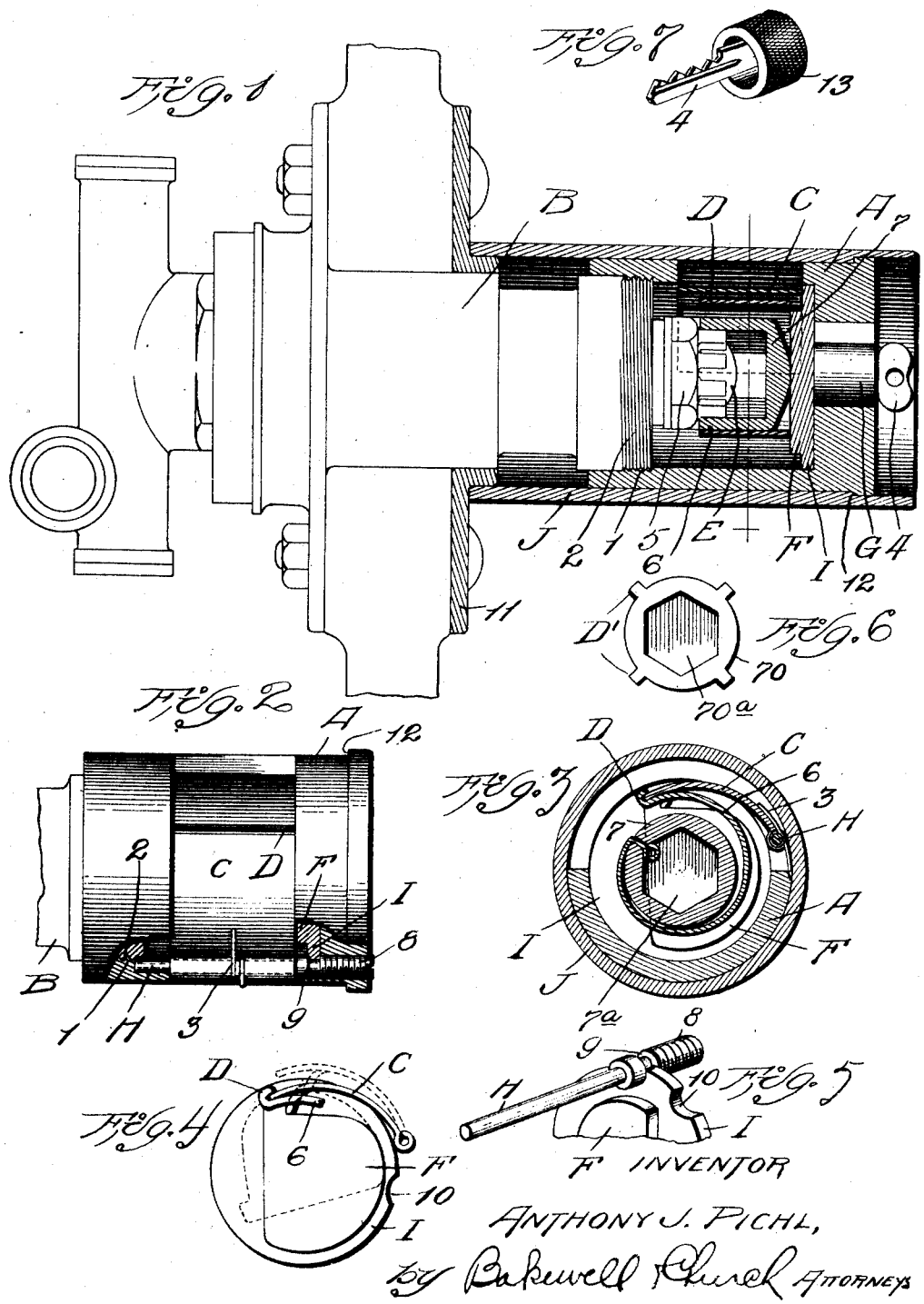

ANTHONY J. PICHL, OF ST. LOUIS, MISSOURI.

VEHICLE-LOCKING DEVICE.

1,365,949.  Specification of Letters Patent.  Patented Jan. 18, 1921.

Application filed July 1, 1919. Serial No. 308,047.

*To all whom it may concern:*

Be it known that I, ANTHONY J. PICHL, a citizen of the United States, residing at St. Louis, Missouri, have invented a certain new and useful Improvement in Vehicle-Locking Devices, of which the following is a full, clear, and exact description, such as will enable others skilled in the art to which it appertains to make and use the same.

This invention relates to vehicle locking devices of the type that are used for locking one wheel of a vehicle to the axle or spindle on which the wheel is mounted.

One object of my invention is to provide an efficient locking device of simple design, that can be applied easily to the front wheel of an automobile, motor truck or similar vehicle by simply removing the usual hub cap from one of the front wheels and substituting my improved locking device for said hub cap.

Another object is to provide a hub locking device of the general character referred to which comprises an efficient means of novel construction for preventing the body member of the device from being removed from the hub of the wheel on which said body member is mounted. Other objects and desirable features of my invention will be hereinafter pointed out.

Briefly described, my invention consists in a wheel locking device comprising a body member that is adapted to be substituted for the usual hub cap on one of the front wheels of an automobile, motor truck or other vehicle, a locking element on said body member that is adapted to coöperate with a part carried by the spindle or axle on which the wheel revolves so as to prevent the wheel from rotating forwardly, a key-controlled means for rendering said locking element operative and inoperative and means for preventing an unauthorized person from removing said body member from the hub of the wheel on which it is mounted. The means just referred to preferably consists of a locking pin that keys the body member to the hub of the wheel and a device governed by said key-controlled means for preventing said locking pin from being removed when the locking element of the device is in its operative position. If desired, a sleeve can be loosely mounted on the body member so as to prevent a wrench or other tool from being applied to said member to twist it off the hub of the wheel.

Figure 1 of the drawings is a longitudinal sectional view of a hub locking device constructed in accordance with my invention.

Fig. 2 is a top plan view of the body member, partly broken away.

Fig. 3 is a cross-sectional view, taken on the section line of Fig. 1, looking in the direction indicated by the arrow.

Fig. 4 is a detail view, illustrating the operation of the locking element and the cam that governs the position of same.

Fig. 5 is a perspective view of the locking pin and the disk that prevents said pin from being removed when the locking element is operative.

Fig. 6 illustrates a rigid toothed part that can be mounted on the spindle nut to coöperate with the locking element; and Fig. 7 is a perspective view of a key provided with a dust cap for preventing dirt from entering the lock in the end wall of the body member.

Referring to the drawings which illustrate the preferred form of my invention, A designates the body member of my improved locking device which preferably consists of a cylindrical shaped member closed at one end and provided at its opposite end with internal screw threads 1 so as to enable said member to be screwed onto the externally screw-threaded portion 2 on the hub B of a front wheel after the usual hub cap (not shown) has been removed from the externally screw-threaded portion 2 of the hub. The body member A is provided with a movable locking element, herein illustrated as a pivotally-mounted, spring-pressed pawl C that is adapted to coöperate with a part D carried by the wheel spindle E to prevent the wheel from rotating forwardly. It is immaterial how the locking element C is mounted on the body member A, but I prefer to arrange said locking element in an opening or cut-out portion in the body member A, as shown in Figs. 2 and 3 and pivotally mount said locking element on a locking pin, hereinafter described, that is used for keying the body member to the hub of the wheel, said locking element being acted upon by a spring 3 which exerts pressure on same in a direction tending to force the free end of said locking element into the path of the part D carried by the spindle. When the vehicle is in use the locking element C is held in its inoperative position out of the path of the part D by a key-controlled means, as shown in broken lines in Fig. 4, and when it is desired to lock the vehicle, said key-controlled means is moved into such a position that the free end of the locking element C will move into the path of the part D carried by the spindle, as shown in full lines in Figs. 2 and 3, thereby preventing the wheel from rotating forwardly. Various means can be used for moving the locking element C into and out of operative position, but I prefer to use a cam F that is arranged inside of the body member A and which is combined with the movable element G of a key-controlled lock in such a manner that said cam can be moved by inserting the key 4 in the lock and turning said key. Any suitable key-controlled lock can be used for governing the position of the cam F, but I prefer to mount an ordinary pin lock in the end wall of the body member A, as shown in Fig. 1, and rigidly connect the cam F with the barrel or movable element G of said lock, thereby causing the cam F to move in a direction to permit the locking element C to become operative when the barrel of the lock is turned in one direction and move into a position to cause the locking element C to become inoperative when said barrel is turned in the opposite direction.

The part or abutment D on the wheel spindle with which the locking element C coöperates can be formed in various ways without departing from the spirit of my invention. In order to facilitate the installation of the device, I prefer to construct the part D in such a manner that it can be applied to the wheel spindle by simply slipping a member that carries said part over the usual nut 5 on the spindle that holds the wheel in operative position on the spindle. Moreover, the part D may either consist of a rigid abutment or device that is incapable of moving relatively to the spindle when it is engaged by the locking element C, or it may consist of an abutment or stop that is capable of moving slightly relatively to the spindle so as to gradually absorb the shock or jar produced by the engagement of the locking element C with said stop or abutment. One convenient way of constructing the device is illustrated in Figs. 1 and 3, wherein the part D consists of a tooth or lug on one end of a stout spring 6 carried by a member 7 that can be slipped over the spindle nut 5, said member 7 being provided with a hexagonal shaped socket $7^a$, as shown in Fig. 3, that conforms to the shape of the spindle nut so as to prevent the member 7 from turning relatively to the spindle nut. Such a construction is desirable, in that it permits the abutment D to yield sufficiently relatively to the wheel spindle to prevent said abutment from being sheared or disconnected from the spindle in the event an attempt is made to propel the vehicle forwardly when the locking element C is in its operative position. While I prefer to construct the device in the manner just described, namely, mount the abutment D on the wheel spindle in such a manner that it is capable of moving slightly relatively to the spindle so as to absorb a sudden shock or jar, it is not essential that the abutment D be constructed in this manner, for if desired, the part on the wheel spindle that coöperates with the locking element C may consist of a rigid tooth D' on a member 70 that is adapted to be slipped over the spindle nut 5, said member having a hexagonal shaped socket $70^a$, as shown in Fig. 6.

The body member A is locked securely to the wheel hub by means of a locking pin H whose inner end portion is seated in coöperating grooves formed in the internal screw threads 1 at the inner end of the body member A and in the external screw threads on the portion 2 of the wheel hub, said locking pin extending longitudinally of the body member A, as shown in Fig. 2. The locking pin H has a screw-threaded portion 8 that is screwed into the body member A, and means is provided for preventing said locking pin from being removed when the locking element C is in its operative position. The means that I prefer to use for securing the locking pin H consists of a disk I arranged so that the peripheral edge portion of same will enter a notch or annular groove 9 in the locking pin H when the cam F moves into such a position that the locking element C will become operative. When the device is unlocked, or, in other words, when the cam F occupies such a position that it holds the locking element C out of the path of the part D on the spindle, a notch 10 in the peripheral edge of the disk I alines with the locking pin H. When the cam F is turned to render the locking element C operative, the unnotched portion of the disk I enters the groove 9 in the locking pin H, as shown in Fig. 5, thus eliminating the possibility of an unauthorized person releasing the front wheel of the vehicle when it is locked by withdrawing the locking pin H and unscrewing the body member A from the hub of the wheel. In manufacturing the device I prefer to rigidly connect the disk I to one end of the barrel G of an ordinary pin lock and form the cam F on the opposite side of said disk. The barrel of the lock is loosely mounted in the end wall of the body member A and the disk I has no positive connection with said body member, thereby permitting the key-controlled lock, the disk I and the cam F as a unit to be slipped into operative position in the end wall of the body member A. Said unit is retained in operative position in the body member A by so proportioning said body member that the member 7 on the spindle nut which carries the abutment D will be arranged in sufficiently close proximity to the cam F to hold the barrel G of the lock in operative position in the end wall of the body member A, as shown in Fig. 1. If desired, the device can be provided with a sleeve that is loosely mounted on the body member A in such a manner that it is impossible to apply a wrench or other tool to the body member A to twist it off the hub of the wheel. In the form of my invention herein illustrated the body member A is housed in or completely surrounded by a sleeve J arranged between the outside spoke flange 11 on the hub of the wheel and a shoulder 12 on the body member A and provided at its outer end with a reduced extension that projects laterally beyond the outer end of said body member, said sleeve being mounted on the body member A in such a manner that it can rotate or turn freely relatively to same.

To install my improved locking device the hub cap of the wheel (not shown) is removed from the externally-screw-threaded portion 2 of the wheel hub, and the body member A of my improved locking device is then screwed onto the externally-screw-threaded portion 2 of the wheel hub. Before the locking pin H is inserted in the hole provided for same in the body member A, a drill is introduced into said hole so as to cut a key-way or two alined grooves in the coöperating screw threads at the inner end of the body member A and on the portion 2 of the wheel hub. The body member A is then unscrewed from the hub and the sleeve J is slipped over said body member. Thereafter, the body member A with the sleeve J thereon is screwed into operative position on the hub of the wheel and the locking pin H is screwed into the member A so as to key said member A to the hub of the wheel, thus completing the operation of installing the device. When the vehicle is in use the cam F stands in such a position that it holds the free end of the locking element C out of the path of the abutment D carried by the wheel spindle, as shown in broken lines. To lock the vehicle it is only necessary to turn the key 4 in the lock that governs the cam F so as to cause the barrel of said lock to move the cam F into such a position that the free end of the locking element C will move into the path of the coöperating abutment D carried by the wheel spindle, thereby locking the vehicle, due to the fact that the wheel cannot revolve forwardly. I prefer to use a pin lock of the type in which the key remains in the lock when the lock is inoperative so as to overcome the necessity of withdrawing the key from the lock after the locking element C has been rendered inoperative, but it is immaterial, so far as my broad idea is concerned, what kind of means is used for governing the position of the cam F, so long as said means is of such a character that it is impossible for an unauthorized person to shift the locking element C into and out of its operative position. If desired, the key of the lock that governs the cam F can be combined with a dust cap 13, as shown in Fig. 7, so as to prevent dirt and dust from collecting on the exposed portion of the lock that projects through the end wall of the body member A, it being understood that such a key is desirable only in the event the device is equipped with a lock of the type in which the key is adapted to remain in the lock when the lock is inoperative.

A vehicle locking device of the construction above described can be installed easily and it forms a very efficient locking device for automobiles, motor trucks and similar vehicles, due to the fact that the body member A of the device is keyed to the wheel hub by a locking pin H which cannot be removed when the locking element C is operative and said body member is completely surrounded by a loose sleeve J, thereby making it impossible to apply a wrench to the body member A and twist it off the hub.

While I have herein illustrated the body member A provided at its inner end with internal screw threads that coöperate with external screw threads on the hub of the wheel, it will, of course, be understood that it is immaterial, so far as my invention is concerned, how the body member A is connected to the hub of the wheel, for in some instances the body member A will be provided with external screw threads that screw into an internally-screw-threaded flange on the hub of the wheel.

Having thus described my invention, what I claim as new and desire to secure by Letters Patent, is:

1. A vehicle locking device, comprising a body member that is adapted to be screwed onto the hub of a vehicle wheel in place of the usual hub cap, a key-controlled means carried by said body member for preventing the wheel from turning forwardly, and a loose sleeve surrounding said body member so as to prevent a tool from being applied to said member to unscrew it from the hub of the wheel.

2. A vehicle locking device, comprising a body member that is adapted to be screwed onto the hub of a wheel in place of the usual hub cap, a key-controlled means on said body member for preventing the wheel from turning forwardly, a device governed by said key-controlled means for securing said body member to the hub of a wheel, and a loose sleeve that surrounds said body member and prevents a tool from being applied to said member so as to unscrew it from the hub.

3. A vehicle locking device, comprising a body member adapted to be mounted on the hub of a wheel, a locking element on said member for preventing the wheel from rotating in one direction relatively to the axle on which the wheel is mounted, a key-controlled means for governing the position of said locking element, a key for securing said body member to the hub of the wheel, and a device governed by said key-controlled means for preventing the removal of said key.

4. A vehicle locking device, comprising a body member that is adapted to be screwed onto the hub of a wheel, a locking element for said wheel carried by said body member, a key-controlled means on said body member for governing the position of said locking element, a locking pin arranged longitudinally of said body member in coöperating grooves in said member and in the hub of the wheel, and a device governed by said key-controlled means that enters a notch in said locking pin when the wheel is locked.

5. A vehicle locking device, comprising a tubular body member adapted to be screwed onto the hub of a wheel in place of the usual hub cap, said member being provided with an end wall, a locking element on said member, a part adapted to coöperate with said locking element and carried by the axle on which the wheel turns, a key-controlled lock mounted in the end wall of said body member and provided with a rotatable barrel, a cam secured to said barrel for moving said locking element into and out of operative position, a locking pin for securing said body member to the hub of the wheel, and a disk combined with the barrel of said lock and arranged so that it enters a notch in said locking pin when said locking element is in its operative position.

6. A vehicle locking device, comprising a tubular body member adapted to be screwed onto the hub of a wheel in place of the usual hub cap, said member being provided with an end wall, a locking element on said member, a part carried by the spindle on which the wheel turns and adapted to coöperate with said locking element, a key-controlled lock mounted in the end wall of said body member and provided with a rotatable barrel, a cam secured to said barrel for moving said locking element into and out of operative position, a locking pin for securing said body member to the hub of the wheel, a disk combined with the barrel of said lock and arranged so that it enters a notch in said locking pin when said locking element is in its operative position, and a loose sleeve that completely surrounds said body member and thus prevents said member from being engaged by a tool to unscrew said body member from the hub of the wheel.

7. A vehicle locking device, comprising a body member that is adapted to be screwed onto the hub of a wheel in place of the usual hub cap, a pivotally mounted locking element on said body member, a resilient device carried by the spindle of the wheel and provided with an abutment that coöperates with said locking element, and a key-controlled means on said body member for governing the position of said locking element.

ANTHONY J. PICHL.